United States Patent [19]

Campbell et al.

[11] 4,095,283
[45] June 13, 1978

[54] FIRST IN-FIRST OUT MEMORY ARRAY CONTAINING SPECIAL BITS FOR REPLACEMENT ADDRESSING

[75] Inventors: John Edward Campbell; Gerhard Robert Thompson, both of Wappingers Falls, N.Y.

[73] Assignee: International Business Machines Corporation, Armonk, N.Y.

[21] Appl. No.: 702,363

[22] Filed: Jul. 2, 1976

[51] Int. Cl.² .............................................. G11C 8/00
[52] U.S. Cl. .................................... 365/230; 364/200
[58] Field of Search ................... 340/173 R, 173 AM

[56] References Cited

U.S. PATENT DOCUMENTS

| | | | |
|---|---|---|---|
| 3,441,908 | 4/1969 | Mizzi | 340/172.5 |
| 3,984,817 | 10/1976 | Barbour et al. | 364/200 |
| 4,008,460 | 2/1977 | Bryant et al. | 364/200 |

Primary Examiner—Stuart N. Hecker
Attorney, Agent, or Firm—Robert J. Haase

[57] ABSTRACT

A first in - first out auxiliary memory array for storing binary data wherein each member (word) of the array includes a special bit which is used in combination with the special bits of the other members comprising the same member set to form the address of the next member whose data is to be replaced. Each member comprises an identifier field, a data field and the aforementioned special bit. When a member set is addressed, each member of the set is read to determine whether there is a match on the respective identifier field. If there is a match, the data field of the same member is utilized. If there is no match on the identifier field of any member of the addressed set, the main memory is accessed for the necessary replacement information which is to be written into the member which contains the oldest data. The address of the last-named member is determined by the exclusive ORing of the special bits of all the members comprising the given set. When the replacement data is written into the addressed member, the state of the special bit thereof is inverted. The inverted state of the special bit is written into the member simultaneously with the writing in of the replacement data.

9 Claims, 2 Drawing Figures

FIRST IN-FIRST OUT MEMORY ARRAY CONTAINING SPECIAL BITS FOR REPLACEMENT ADDRESSING

BACKGROUND OF THE INVENTION

As as is well understood, cache memory arrays are utilized as high speed buffers between a central processing unit and main storage. The CPU searches the identifier fields of all the members comprising a given addressed set of the array for a "match". If a match is found, the search for the required information is completed and the data associated with the member yielding the match is utilized by the CPU. In those instances where no match is produced after the identifier fields of all the members of a given set have been searched, the main memory is accessed for the necessary information and it is then written into the member of the addressed set containing the oldest data. The member containing the oldest data is selected in accordance with a first in - first out (FIFO) algorithm.

FIFO algorithms previously have been implemented by logic such as, for example, a binary or ring counter, external to the cache array. The external logic is repeated for each set of members within the array. Not only does the physical bulk of the required external logic circuits increase directly with increases in the number of sets comprising the cache array, but the costs of hardware, packaging and testing the combination of the array and the logic circuits increases significantly to create a very undesirable situation especially where large scale integration circuit techniques are employed.

SUMMARY OF THE INVENTION

A single logic system, independent of the number of member sets in the cache array, is utilized for implementing the FIFO algorithm. Each member is provided with a special bit in addition to the identifier field and the data field. The special bit from each member comprising an addressed set of the array is applied to an exclusive OR network which produces the address of the member of the given set containing the oldest data. When it is determined that new data is to be written from main memory into the oldest data containing member, the special bit of said member is inverted and the inverted bit together with the identifier field and the replacement data is written into the addressed member. A single logic system external to the cache array for replacing the data in any member of any set within the array is made possible by the fact that the information representing the oldest data-containing member is stored within the array itself in the form of the special bits included within the members of every set.

DESCRIPTION OF THE PREFERRED EMBODIMENT

Figure 1:
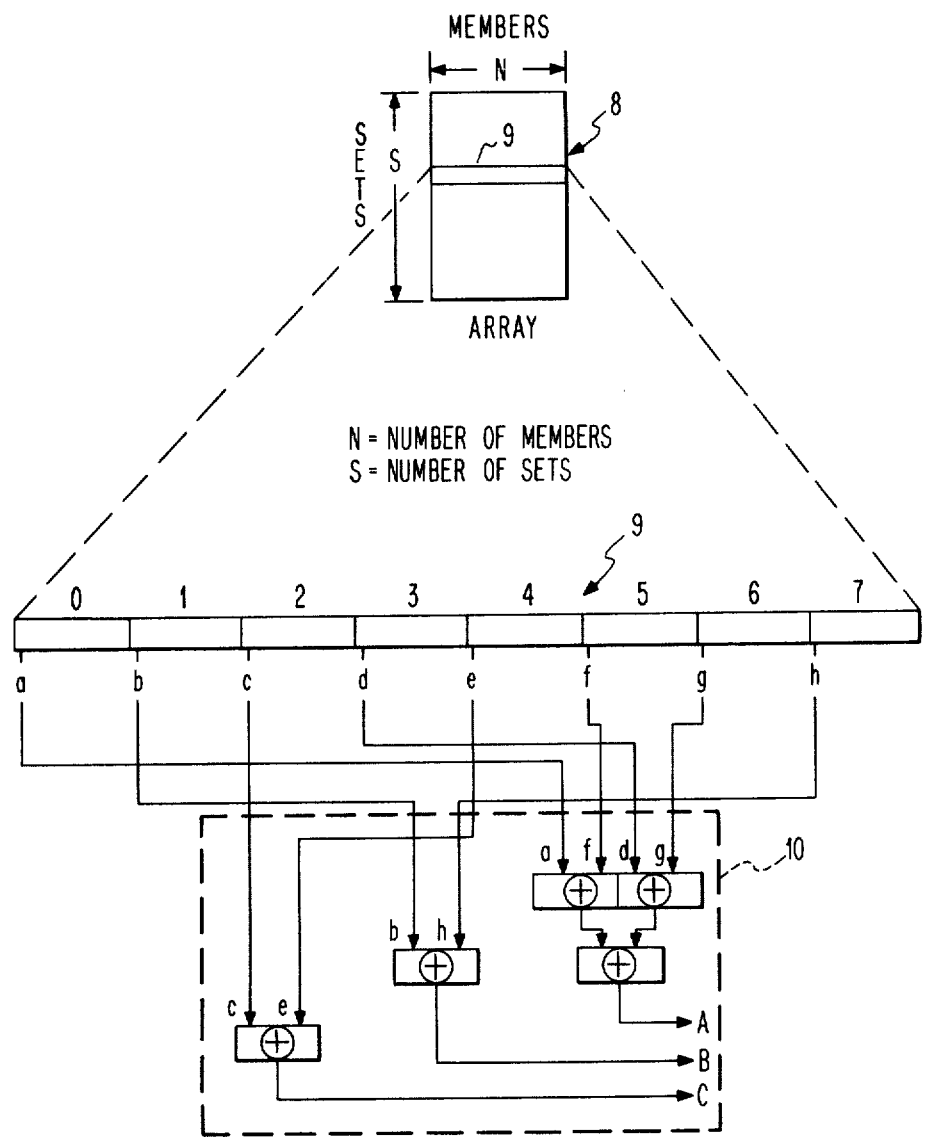
FIG. 1 is a simplified diagram useful in explaining the concepts of the present invention.

FIG. 1 represents an auxiliary or cache memory 8 such as may be used, in a typical embodiment of the present invention, as a high speed buffer located between a central processing unit (not shown) and a main storage (not shown). Cache 8 consists of an array of memory cells arranged in N member columns and M set rows. In the example given, each set consists of eight members such as exemplary set 9 which consists of the eight members designated 0–7 inclusive, as shown. Each member, in turn, includes identifier and data fields and an additional special bit. The special bits, designated $a$ through $h$, inclusive, are read and applied to exclusive OR circuit 10 to provide a three bit address designated A, B, and C representing the address of the member of set 9 storing the oldest data in the manner now to be described.

Each time that new data is to be written into one of the members of the set, the state of the respective special bit is inverted. None of the special bits of the remaining members of the same set are altered at the same time inasmuch as only one member receives replacement data at a time. In accordance with the present invention, all of the special bits included within the members of the same set are interpreted as a binary code representing the address of the member containing the oldest data immediately prior to the introduction of fresh data into the set. Although many different coding techniques may be employed consistent with the purposes of the present invention, it is convenient to exploit the advantages of a Gray code having the well known property that only one bit changes at a time when progressing from one numerical value to the next value. Exclusive OR circuit 10 converts the special bits included within members 0–7 of set 9 into a three bit Gray code, each bit being represented by the outputs designated A, B, and C.

More particularly, Gray code bit A is produced by the exclusive ORing of special bits $a$, $f$, $d$ and $g$. Gray code bit B is produced by the exclusive ORing of special bits $b$ and $h$. Gray code bit C is produced by the exclusive ORing of special bits $c$ and $e$.

The following table represents the progression of the Gray code bits C, B, and A correlated with the corresponding progression of the addresses of the members which receive replacement data and the contemporaneous values of the special bits:

| Gray Code | | | Member Address | Special Bits | | | | | | | |
|---|---|---|---|---|---|---|---|---|---|---|---|
| C | B | A | | a | b | c | d | e | f | g | h |
| 0 | 0 | 0 | 0 | 0 | 0 | 0 | 0 | 0 | 0 | 0 | 0 |
| 0 | 0 | 1 | 1 | 1 | 0 | 0 | 0 | 0 | 0 | 0 | 0 |
| 0 | 1 | 1 | 3 | 1 | 1 | 0 | 0 | 0 | 0 | 0 | 0 |
| 0 | 1 | 0 | 2 | 1 | 1 | 0 | 1 | 0 | 0 | 0 | 0 |
| 1 | 1 | 0 | 6 | 1 | 1 | 1 | 1 | 0 | 0 | 0 | 0 |
| 1 | 1 | 1 | 7 | 1 | 1 | 1 | 1 | 0 | 0 | 1 | 0 |
| 1 | 0 | 1 | 5 | 1 | 1 | 1 | 1 | 0 | 0 | 1 | 1 |
| 1 | 0 | 0 | 4 | 1 | 1 | 1 | 1 | 0 | 1 | 1 | 1 |

If replacement data is to be writeen into set 9 when the Gray code output of exclusive OR circuit 10 is 000, member 0 is addressed and the replacement data is written into it. Simultaneously with the writing of the replacement data, the special bit "$a$" included within member 0 is inverted causing Gray code bit A to invert to 1 as a consequence of the exclusive ORing of special bits $a$, $f$, $d$ and $g$ having the values 1, 0, 0 and 0, respectively.

The next time that new data is to be written into a member of the same set 9, the new data is written into member 1 at the same time that the special bit "$b$" is inverted to a 1. The inversion of special bit $b$ causes the Gray code bit B to invert from its preexisting value 0 to 1 as a consequence of the exclusive ORing of special bits $b$ and $h$ having the values 1 and 0, respectively. This action is represented by the second row of the above table. It will be noted, however, that when new data is to be written into set 9 for a third time, member 3 is addressed (rather than member 2), the special bit $d$ thereof is inverted and the Gray code bit A is inverted to its original value 0 as a consequence of the exclusive ORing of special bits $a$, $f$, $d$ and $g$ having the values 1, 0, 1 and 0, respectively. The subsequent addresses of the members receiving new data and the corresponding Gray code sequences and special bit sequences are shown in the above table. After eight successive new data writing cycles have been completed (member 4 being the last of the eight members receiving new data according to the table), the cycle repeats and the first - first out (FIFO) algorithm has been satisfied. On the second cycle, all special bits have the same initial value of 1 rather than 0 but exclusive OR circuit 10 provides the same sequence of Gray code values as shown in the table. On the third cycle, the special bits again assume the same values as shown in the table.

To summarize the above described operation, each time new data is to be written into one of the members of a set, all of the special bits included within the set are operated upon by an exclusive OR circuit to yield the address of the member storing the oldest data. As the new data is written into said member, the special bit thereof simultaneously is inverted. The exclusive ORing of the special bits of the member set including the inverted special bit then yields the address of the member storing the next oldest data. Thus, the special bits included within the members of a member set continuously represent the address of the member then having the oldest data. There is no need for the addition of circuitry external to the array to keep track of the FIFO history.

Figure 2:
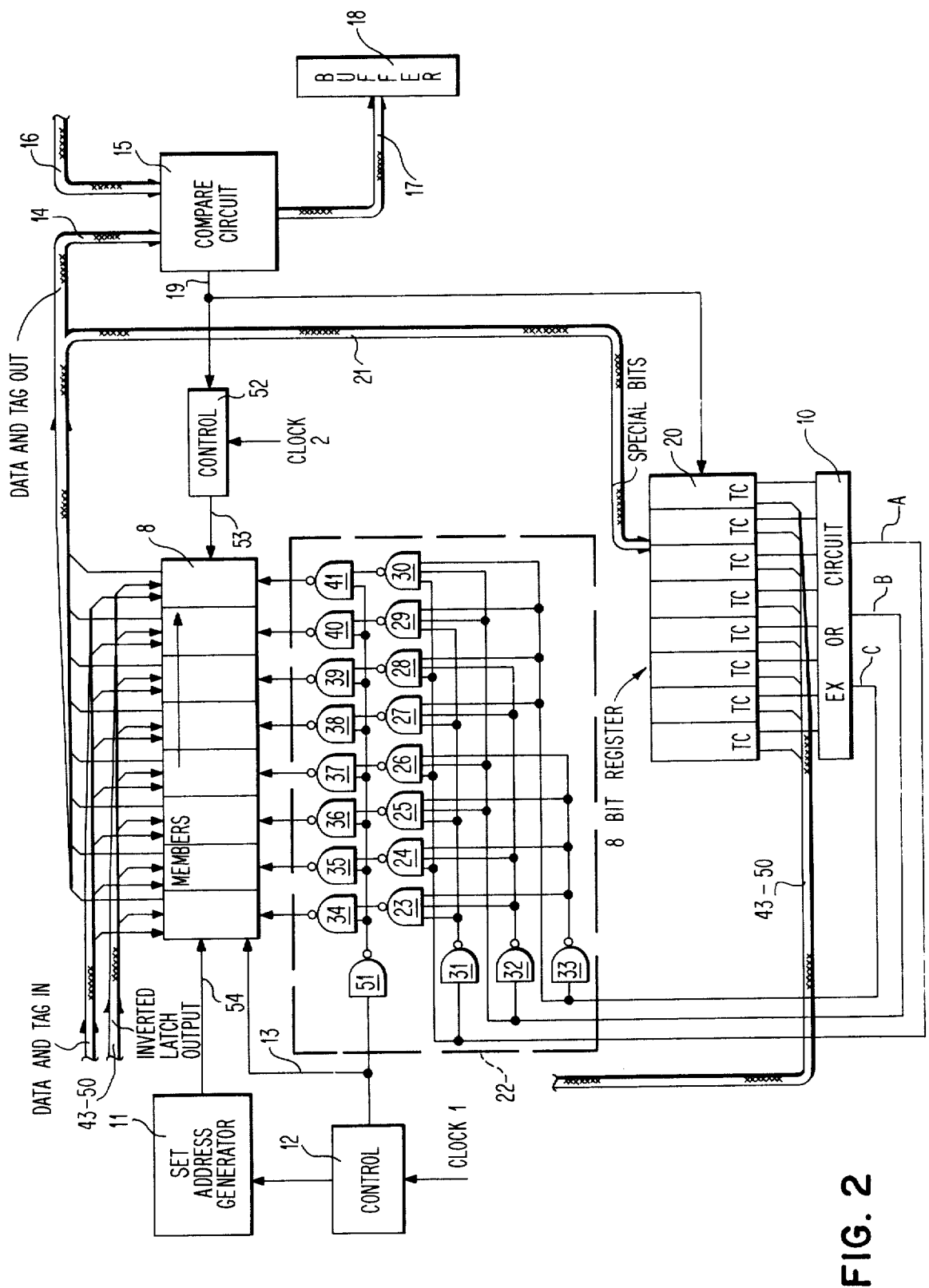
FIG. 2 is a simplified block diagram of a preferred embodiment of the present invention.

Referring now to the preferred embodiment of the present invention represented by the simplified block diagram of FIG. 2, auxiliary memory 8 is searched in a conventional manner by addressing a desired member set thereof with the aid of set address generator 11 and control 12, the latter being actuated by clock 1. The details of generator 11, control 12 and clock 1 are of no significance to the present invention and may be provided by a central processing unit as is well understood in the art for addressing a buffer memory array. Upon the occurrence of a read signal on line 13 from control 12, all eight members of the set addressed by generator 11 are read. More particularly, the identifier fields, data fields and special bits of all the addressed members are read and are placed on output bus 14 which is one input to compare circuit 15. Compare circuit 15 also receives a desired identifier field from input bus 16. If any of the identifier fields on bus 14 matches the desired identifier field on bus 16, compare circuit 15 places the data field information of the member producing the "compare" on output bus 17 for temporary storage in buffer 18. In the event that there is no "compare" between any of the identifier fields on bus 14 with the desired identifier field on bus 16, a "no compare" signal is provided by circuit 15 on output line 19.

The signal on line 19 is applied to register 20 which also receives via bus 21 the special bits from the addressed member set. More particularly, the signal on line 19 loads the special bits into register 20. As previously described in connection with FIG. 1, the special bits then are applied to exclusive OR circuit 10 which provides signals representing the respective Gray code bits A, B, and C.

The Gray code signals representing the address of the member to receive replacement data is applied to NAND network 22 which also receives the read signal on line 13 from control 12. NAND gates 23–30 within network 22 receive the true and complement Gray code signals, the complement signals being generated by inverters 31, 32, and 33. In typical decoder fashion, one of the NAND gates 23–30 will produce an output activating a respective one of NAND gates 34–41 which selects one of the members of the addressed member set within array 8. The replacement data consisting of the identifier field and data field is applied by bus 42 from main storage (not shown). The special bits, having the required inverted value as previously discussed, is applied via a respective one of the conductors 43–50 which are connected to the respective complement value outputs of the individual latches comprising special bit register 20. The read signal on line 13 from control 12 is initiated by clock 1 and has a duration sufficient to permit the "no compare" signal to be generated by circuit 15 and be applied by line 19 to register 20 and to allow the latching of the special bits into register 20.

Inverter 51 within NAND network 22 inverts the read signal on line 13 to condition all of the NAND gates 34–41, irrespective of the outputs of the decoder 23–30, for the simultaneous selection of all members during a read interval. During a write interval, on the other hand, the output of inverter 51 conditions NAND gates 34–41 in opposite manner so that only one of them produces a member selection signal in accordance with the respectively connected one of the decoder NAND gates 23–30 uniquely designated by the Gray code signals representing bits A, B, and C. Clock 2 occurs after the "no compare" signal on line 19 has propagated through the delays introduced by register 20, exclusive OR circuit 10 and NAND network 22 to complete the selection of one of the members of the addressed set of array 8 which is to receive the replacement data. Clock 2, in turn, triggers control circuit 52 to initiate the write signal on line 53 allowing the replacement data to be inserted into the member of the addressed set having the oldest data at that time. The set address signal on line 54 remains activated until the "write" sequence is completed.

While the invention has been particularly shown and described with reference to the preferred embodiments thereof, it will be understood by those skilled in the art that various changes in form and details may be made therein without departing from the spirit and scope of the invention.

What is claimed is:

1. A first in - first out memory comprising:
   at least three storage members,
   each said member including a plurality of bit storage means, one of said means storing a special bit,
   Gray code encoding circuit means,
   means for coupling each said special bit storage means to the input of said encoding circuit means,
   member selection means coupled between said encoding circuit means and said members for selecting one of said members in accordance with the output of said circuit means, and
   means for changing the state solely of the special bit storage means included within the member selected by said selection means.

2. The memory defined in claim 1 wherein said encoding circuit means is an exclusive OR circuit.

3. The memory defined in claim 1 wherein said means for coupling is means for selectively coupling.

4. The memory defined in claim 3 wherein each said member also includes identifier bit signal storage means, and further including
- a compare circuit coupled to receive stored identifier bit signals and desired identifier bit signals for producing a first control signal upon a mismatch, and
- means for actuating said means for selectively coupling upon the occurrence of said first control signal.

5. The memory defined in claim 3 wherein each said member also includes identifier bit signal storage means and data bit signal storage means, and further including
- a compare circuit coupled to receive stored identifier bit signals and esired identifier bit signals for producing a first control signal upon a mismatch and a second control signal upon a match,
- means for actuating said means for selectively coupling upon the occurrence of said first control signal,
- means for introducing replacement data signals into said data bit signal storage means upon the occurrence of said first control signal, and
- means for outputting said data bit signals upon the occurrence of said second control signal.

6. The memory defined in claim 3 wherein each said member also includes identifier bit signal storage means and data bit signal storage means, and further including
- a compare circuit coupled to receive stored identifier bit signals and desired identifier bit signals for producing a first control signal upon a mismatch and a second control signal upon a match,
- means for actuating said means for selectively coupling upon the occurrence of said first control signal, and
- means for outputting said data bit signals upon the occurrence of said second control signal.

7. The memory defined in claim 3 wherein each said member also includes identifier bit signal storage means and data bit signal storage means, and further including
- a compare circuit coupled to receive stored identifier bit signals and desired identifier bit signals for producing a first control signal upon mismatch,
- means for actuating said means for selectively coupling upon the occurrence of said first control signal, and
- means for introducing replacement data signals into said data bit signal storage means upon the occurrence of said first control signal.

8. The memory defined in claim 1 wherein each said member also includes identifier bit signal storage means and data bit signal storage means, and further including,
- a compare circuit coupled to receive stored identifier bit signals and desired identifier bit signals for producing a second control signal upon a match, and
- means for outputting said data bit signals upon the occurrence of said second control signal.

9. The memory defined in claim 1 wherein each said member also includes identifier bit signal storage means and data bit signal storage means, and further including,
- a compare circuit coupled to receive stored identifier bit signals and desired identifier bit signals for producing a first control signal upon a mismatch, and
- means for introducing replacement data signals into said data bit signal storage means upon the occurrence of said first control signal.

* * * * *